US008942417B2

(12) United States Patent
Kishima et al.

(10) Patent No.: US 8,942,417 B2
(45) Date of Patent: Jan. 27, 2015

(54) METHOD FOR DETECTION OF SPECIMEN REGION, APPARATUS FOR DETECTION OF SPECIMEN REGION, AND PROGRAM FOR DETECTION OF SPECIMEN REGION

(75) Inventors: Koichiro Kishima, Kanagawa (JP); Ryu Narusawa, Kanagawa (JP); Goh Matsunobu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/303,279

(22) Filed: Nov. 23, 2011

(65) Prior Publication Data
US 2012/0140983 A1 Jun. 7, 2012

(30) Foreign Application Priority Data

Dec. 1, 2010 (JP) ................. 2010-268442

(51) Int. Cl.
*G06K 9/00* (2006.01)
*G02B 21/36* (2006.01)
*G02B 21/16* (2006.01)
*G06T 7/00* (2006.01)

(52) U.S. Cl.
CPC .............. *G02B 21/365* (2013.01); *G02B 21/16* (2013.01); *G06T 7/0081* (2013.01); *G06T 7/0097* (2013.01); *G06T 2207/10056* (2013.01); *G06T 2207/20221* (2013.01); *G06T 2207/30024* (2013.01)
USPC .......................................... 382/103; 382/128

(58) Field of Classification Search
None
See application file for complete search history.

(56) References Cited

U.S. PATENT DOCUMENTS 5,581,487 A * 12/1996 Kelly et al. .................... 702/85
6,259,807 B1 * 7/2001 Ravkin ......................... 382/133
2009/0190812 A1 7/2009 Sano et al.

FOREIGN PATENT DOCUMENTS

JP 2009-175040 A 8/2009

OTHER PUBLICATIONS

Da Costa, Victor, et al. "Nondestructive imaging of live human keloid and facial tissue using multiphoton microscopy." Archives of Facial Plastic Surgery 10.1 (2008): 38-43.*

* cited by examiner

*Primary Examiner* — Stephen R Koziol
*Assistant Examiner* — Amandeep Saini
(74) *Attorney, Agent, or Firm* — Wolf, Greenfield & Sacks, P.C.

(57) ABSTRACT

A method for detecting the specimen region includes the first step for the first region detecting unit to detect the first region which is a region with contrast in the first image of an object for observation which is photographed under illumination with visible light, the second step for the second region detecting unit to detect the second region which is a region with contrast in the second image of the object for observation which is photographed under illumination with ultraviolet light, and the third step for the specimen region defining unit to define, based on the first and second regions mentioned above, the specimen region where there exists the specimen in the object for observation.

6 Claims, 22 Drawing Sheets

FIG.35

| | PIG LOIN | PIG STOMACH | PIG KIDNEY | CATTLE ABOMASUM | CATTLE HEART | CATTLE LIVER |
|---|---|---|---|---|---|---|
| Vimentin | ○ | ○ | ○ | × | △ | ○ |
| Desmin | ○ | ○ | ○ | △ | △ | ○ |
| AE1/AE3 | ○ | △ | ○ | △ | ○ | △ |
| LCA | ○ | ○ | ○ | ○ | ○ | ○ |

METHOD FOR DETECTION OF SPECIMEN REGION, APPARATUS FOR DETECTION OF SPECIMEN REGION, AND PROGRAM FOR DETECTION OF SPECIMEN REGION

BACKGROUND

The present disclosure relates to a method for detection of specimen region, an apparatus for detection of specimen region, and a program for detection of specimen region, which are intended to detect from an image of the object for observation the specimen region where there exists the specimen for microscopic observation.

It is customary in the field of pathological diagnosis to observe a specimen (such as histologic) under a microscope after staining. Staining is usually accomplished by immersing a specimen in a dye solution specific to a particular histology. A dye of certain type combines with an immunohistology (if it exists in the specimen) to develop a color, thereby allowing the observer to determine the presence or absence of the immunohistology in the specimen.

Among recent developments in this field is the automatic photographing of microscopic images. This technology employs a system that works in two stages. In the first stage, the system photographs the object (such as preparation) for observation with a low magnifying power, thereby acquiring an image of low power. Subsequently, the image of low power undergoes image processing for contour detection. In this way, the system extracts the region for microscopic observation where there exists the specimen. In the second stage, the system photographs the region for microscopic observation through a microscope with a high magnifying power, thereby automatically giving a high-power image of the specimen. The foregoing technology avoids photographing with a high power wastefully most regions where there exist no specimens for observation.

An example of the foregoing system is disclosed in Japanese Patent Laid-Open No. 2009-175040 (Paragraph [0026] and FIG. 2) (hereinafter referred to as Patent Document 1). The disclosed system is so designed as to detect "the region for attention" from the photographed pathological image and photograph the region with a high magnifying power, thereby automatically acquiring a high-power pathological image in that region. This system detects the region for attention by using the difference in pixel value (RGB value) of the pathological image.

SUMMARY

Unfortunately, the method for specimen observation disclosed in Patent Document 1 suffers the disadvantage (inherent in using the pixel difference for detection of the region for attention) of involving difficulties in detecting the region for attention in the case of a low-contrast image (in which the pathological image has a small difference in pixel values). For example, the above-mentioned staining method may be able to stain positive tissues but unable to stain negative tissues. In this instance, the foregoing system does not detect negative tissues.

The present disclosure was completed in view of the foregoing. It is desirable to provide a method for detection of specimen region, an apparatus for detection of specimen region, and a program for detection of specimen region, which are intended to detect the region where a specimen exists despite low contrast in that region.

The present disclosure will be achieved by the following three embodiments. The first embodiment is concerned with a method for detection of specimen region.

This method employs two region detecting units. The first region detecting unit examines a first image of the object for observation which has been photographed under illumination with visible light. It detects a high-contrast region in the first image, and this region is designated as the first region.

The second region detecting unit examines a second image of the object for observation which has been photographed under illumination with ultraviolet light. It detects a high-contrast region in the second image, and this region is designated as the second region.

This method also employs a specimen region defining unit, which defines the region where the specimen exists in the object for observation, based on the first and second regions mentioned above.

When the first region detecting unit examines the first image of the object for observation which has been photographed under illumination with visible light, it is capable of detecting the region with a high contrast (which denotes visual characteristic properties such as luminance and color) but is incapable of detecting the region with a low contrast which is hard to distinguish from the background. Assuming here that the specimen contains a region that emits fluorescence upon irradiation with ultraviolet light, the second region detecting unit detects the region with a high contrast in the second image for the object for observation which has been photographed under illumination with ultraviolet light. In this way, the foregoing method permits detection of the specimen which produces a low contrast under illumination with visible light but emits fluorescence under illumination with ultraviolet light. Thus, based on the first and second regions detected respectively by the first and second region detecting units, the specimen region defining unit detects the region of the specimen which produces a low contrast under illumination with visible light but emits fluorescence under illumination with ultraviolet light.

The step of defining the specimen region may be accomplished in such a way that the specimen region defining unit defines the specimen region by combining together the first region and the second region.

By combining together the first region and the second region to have the complete specimen region, the specimen region defining unit completely defines the region where there exists a specimen which produces a contrast under illumination with visible light and the region where there exists a specimen which produces a contrast under illumination with ultraviolet light.

The above-mentioned method for detection of the specimen region may employ a microscope photographing range setting unit. With this unit, the method may have an additional step for establishing the microscope photographing range in which the object for observation is photographed under a microscope.

Confining the specimen region to the microscope imaging region avoids photographing the region where there exist no specimens and excludes the region which does not need to be photographed, thereby allowing rapid microscopic photographing and saving the image memory.

The specimen mentioned above may be a living tissue containing amino acids.

A living tissue containing amino acids emits fluorescence under illumination with ultraviolet light. Consequently, it can be detected by the method for detection of specimen according to the present disclosure even though it merely produces a low contrast under illumination with visible light.

The specimen mentioned above may be one which has been immunohistochemically stained.

Immunohistochemically staining is intended to detect an antigen with the help of an antibody labeled with an enzyme. An immunohistochemically stained specimen gives a positive region and a negative region, which respectively exhibits and does not exhibit contrast under illumination with visible light. "Positive" and "negative" mean respectively that the specimen possesses or does not possess the structure for bonding with the labeling enzyme. Consequently, the method for detection by means of contrast is unable to detect the negative region when it is applied to an image photographed under illumination with visible light. Unlike the foregoing method, the method according to the embodiment of the present disclosure is able to detect the negative region because it processes not only the first image (which is an image photographed under illumination with visible light) but also the second image (which is an image photographed under illumination with ultraviolet light).

According to one embodiment of the present disclosure, an apparatus for detection of specimen region has a first region detecting unit, a second region detecting unit, and a specimen region defining unit.

The first region detecting unit detects the region with contrast in the first image which shows the object for observation photographed under illumination with visible light. The thus detected region is designated as the first region.

The second region detecting unit detects the region with contrast in the second image which shows the object for observation photographed under illumination with ultraviolet light. The thus detected region is designated as the second region.

The specimen region defining unit defines the specimen region where there exists the specimen based on the first and second regions for the object for observation.

According to one embodiment of the present disclosure, a program for detection of specimen region controls the first region detecting unit, the second region detecting unit, and the specimen region defining unit so that they adequately function.

The first region detecting unit detects the region with contrast in the first image which shows the object for observation photographed under illumination with visible light. The thus detected region is designated as the first region.

The second region detecting unit detects the region with contrast in the second image which shows the object for observation photographed under illumination with ultraviolet light. The thus detected region is designated as the second region.

The specimen region defining unit defines the specimen region where there exists the specimen based on the first and second regions for the object for observation.

As mentioned above, the present disclosure provides the method for detection of specimen region, the apparatus for detection of specimen region, and the program for detection of specimen region, which permit detection of the region where there exists the specimen even though the region has a low contrast.

BRIEF DESCRIPTION OF THE DRAWINGS

FIG. 35 is a table showing the intensity of fluorescence induced under illumination with ultraviolet light which was recorded in the examples of the present disclosure;

DETAILED DESCRIPTION OF THE PREFERRED EMBODIMENTS

The embodiments of the present disclosure will be described below with reference to the accompanying drawings.

[Configuration of the Microscope System]

Figure 1:
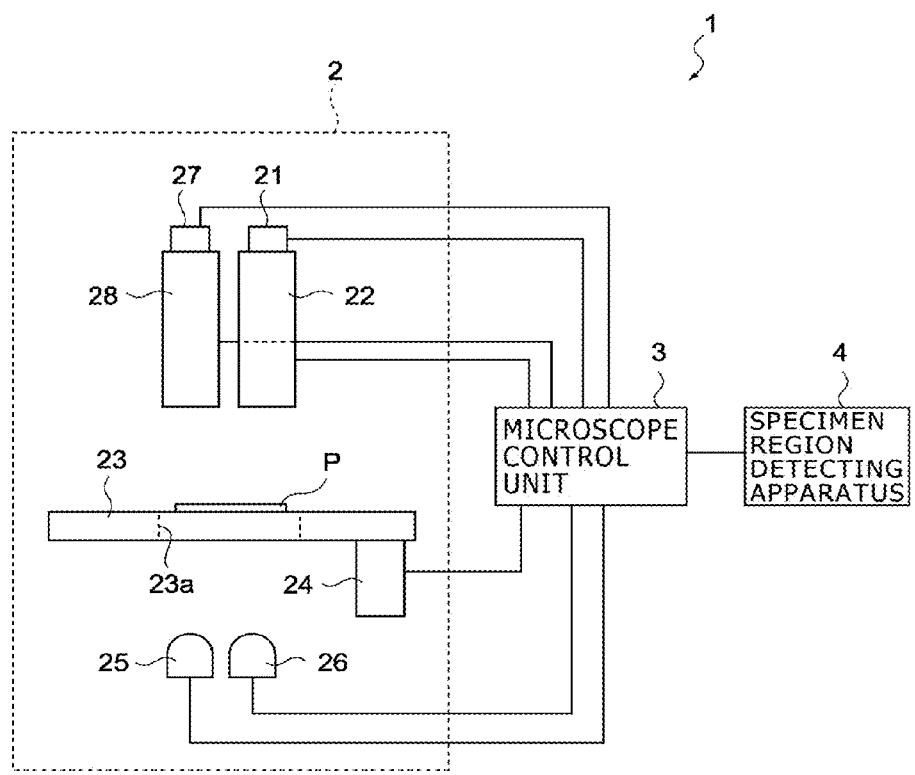
FIG. 1 is a schematic diagram showing the configuration of the microscope system pertaining to one embodiment of the present disclosure.

FIG. 1 is a schematic diagram showing the configuration of the microscope system 1 pertaining to one embodiment of the present disclosure.

As shown in FIG. 1, the microscope system 1 is composed of the microscope 2, the microscope control unit 3, and the specimen region detecting apparatus 4. The microscope control unit 3 is an electric component attached to the microscope 2. The specimen region detecting apparatus 4 is an information processing apparatus connected to the microscope control unit 3. The microscope system 1 may be configured in any other way than shown here for illustration only.

The microscope 2 is an optical microscope designed such that its individual parts work in response to control signals from the microscope control unit 3. It may be an ordinary one except for its UV (ultraviolet) light source. To be more specific, the microscope 2 is composed of the high-power imaging device 21, the high-power lens barrel 22, the low-power imaging device 27, the low-power lens barrel 28, the stage 23, the stage drive unit 24, the visible light source 25, and the UV light source 26. FIG. 1 also shows the preparation P placed on the stage 23.

The high-power imaging device 21 is a digital imaging device equipped with an imaging element, such as CCD (Charge Coupled Device Image Sensor) and CMOS (Complementary Metal Oxide Semiconductor), which is designed for microphotography. The high-power imaging device 21 is also equipped with the high-power lens barrel 22 whose optical system leads the image of the preparation P to the imaging element. The high-power imaging device 21 produces images either in color or in monochrome. The high-power imaging device 21 is connected to the microscope control unit 3 so that it has its imaging timing and exposure properly controlled. The high-power imaging device 21 sends the image data to the specimen region detecting apparatus 4 through the microscope control unit 3.

The low-power imaging device 27 is a digital imaging device equipped with an imaging element, such as CCD and CMOS. The low-power imaging device 27 is also equipped with the low-power lens barrel 28 whose optical system leads the image of the preparation P to the imaging element. The high-power imaging device 21 is provided with a UV absorbing filter (for wavelength longer than 390 nm) that protects the imaging element from UV light. The low-power imaging device 27 is connected to the microscope control unit 3 so that it has its imaging timing and exposure properly controlled. The low-power imaging device 27 sends the image data to the specimen region detecting apparatus 4 through the microscope control unit 3.

The high-power lens barrel 22 is provided with a high-power object lens and a position adjusting mechanism, so that it enlarges the image of the preparation P at prescribed magnifications, say, x20 or x40. It is also connected to the microscope control unit 3 so that it has its focal depth (or autofocusing) controlled.

The low-power lens barrel 28 is provided with a low-power object lens (or reducing optical system) and a position adjusting mechanism, so that it enlarges or reduces the image of the preparation P at prescribed magnifications, say, x0.5, x1, or x2. It is also connected to the microscope control unit 3 so that it has its focal depth (or autofocusing) controlled.

Incidentally, FIG. 1 shows the high-power lens barrel 22 and the high-power imaging device 21 together and the low-power lens barrel 28 and the low-power imaging device 27 together as separate units. However, these components may be combined into one unit consisting of the lens barrel and the imaging device. In this case, magnification can be changed by replacing the object lens in the lens barrel.

The stage 23 is so constructed as to support the preparation P and move it in the directions parallel and perpendicular to the optical axis of the microscope. The stage 23 is also provided with the window 23a that permits transmission of light (including UV light) emitted from the visible light source 25 and the UV light source 26. On this window 23a is the preparation P. The preparation P may be moved by the stage 23 so that it enters the field of view of the high-power lens barrel 22 and the low-power lens barrel 28. Alternatively, the high-power lens barrel 22 and the low-power lens barrel 28 may be moved so that their field of view covers the image of the stationary preparation P.

The stage drive unit 24 is equipped with a stepping motor or similar drive mechanism to move the stage 23 as mentioned above. It is connected to the microscope control unit 3 so that it has its movement (direction and distance) controlled.

The visible light source 25 is a fluorescent light or LED (Light Emitting Diode); it irradiates the preparation P with visible light through the window 23a of the stage 23. The visible light may be white light containing all wavelengths of the visible spectrum. The visible light source 25 is connected to the microscope control unit 3 so that it has its emission timing and intensity controlled.

The UV light source 26 is a UV lamp or UV LED; it irradiates the preparation P with UV light through the window 23a of the stage 23. The UV light may be one having a wavelength of 365 nm. The UV light source 26 is connected to the microscope control unit 3 so that it has its emission timing and intensity controlled.

The microscope 2 is constructed as mentioned above on the assumption that it works automatically with its depth of focus and photographing timing under control by the microscope control unit 3. However, it may be so constructed as to be controlled and operated manually by the user in response to the output from the specimen region detecting apparatus 4.

The microscope control unit 3 is composed of electronic parts including microprocessor so that it controls the microscope 2. It is connected to the specimen region detecting apparatus 4 whose output controls the microscope 2.

Figure 2:
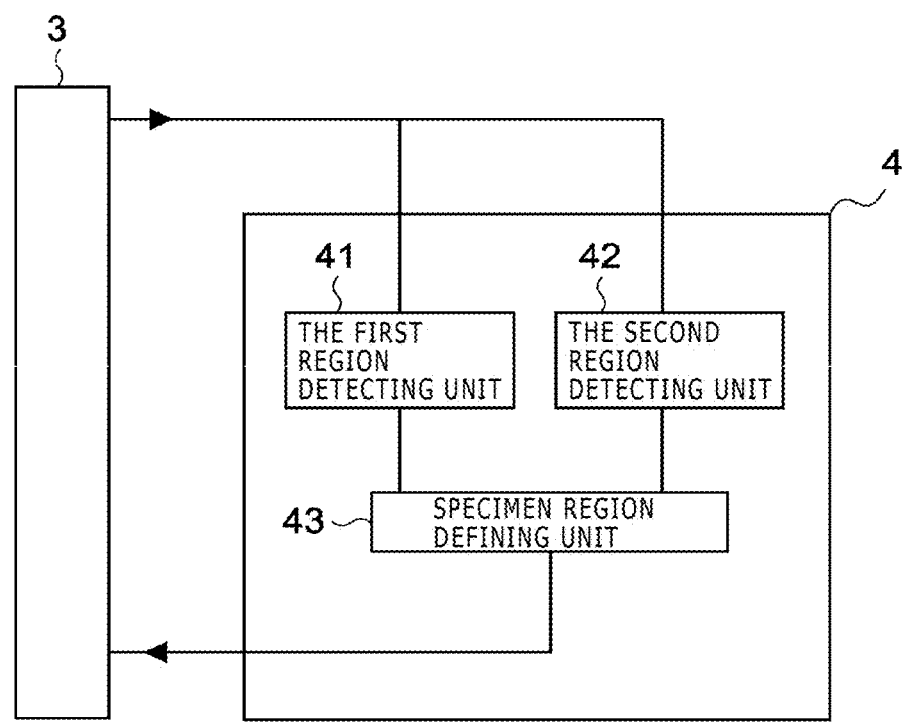
FIG. 2 is a block diagram showing the configuration of the specimen region detecting apparatus in the microscope system mentioned above.

The specimen region detecting apparatus 4 detects the "specimen region" in which there exists the image of the object for observation (the preparation P) which is supplied from the low-power imaging apparatus 27. FIG. 2 is a block diagram showing the functional structure of the specimen region detecting apparatus 4.

As shown in FIG. 2, the specimen region detecting apparatus 4 is composed of the first region detecting unit 41, the second region detecting unit 42, and the specimen region defining unit 43. The first two are connected to the microscope control unit 3, and the last one is connected to the first two and the microscope control unit 3. The constituents of the specimen region defining apparatus 4 function with the help of processor, memory, program, etc. as explained later.

The microscope system 1 is constructed as mentioned above. However, it does not necessarily need to be constructed of specifically designed constituents, such as the microscope 2, the microscope control unit 3, and the specimen region detecting apparatus 4. Any existing microscope system may be additionally incorporated with them as desired.

[Function of the Microscope system]

The following describes the way in which the microscope system 1 functions.

Figure 3:
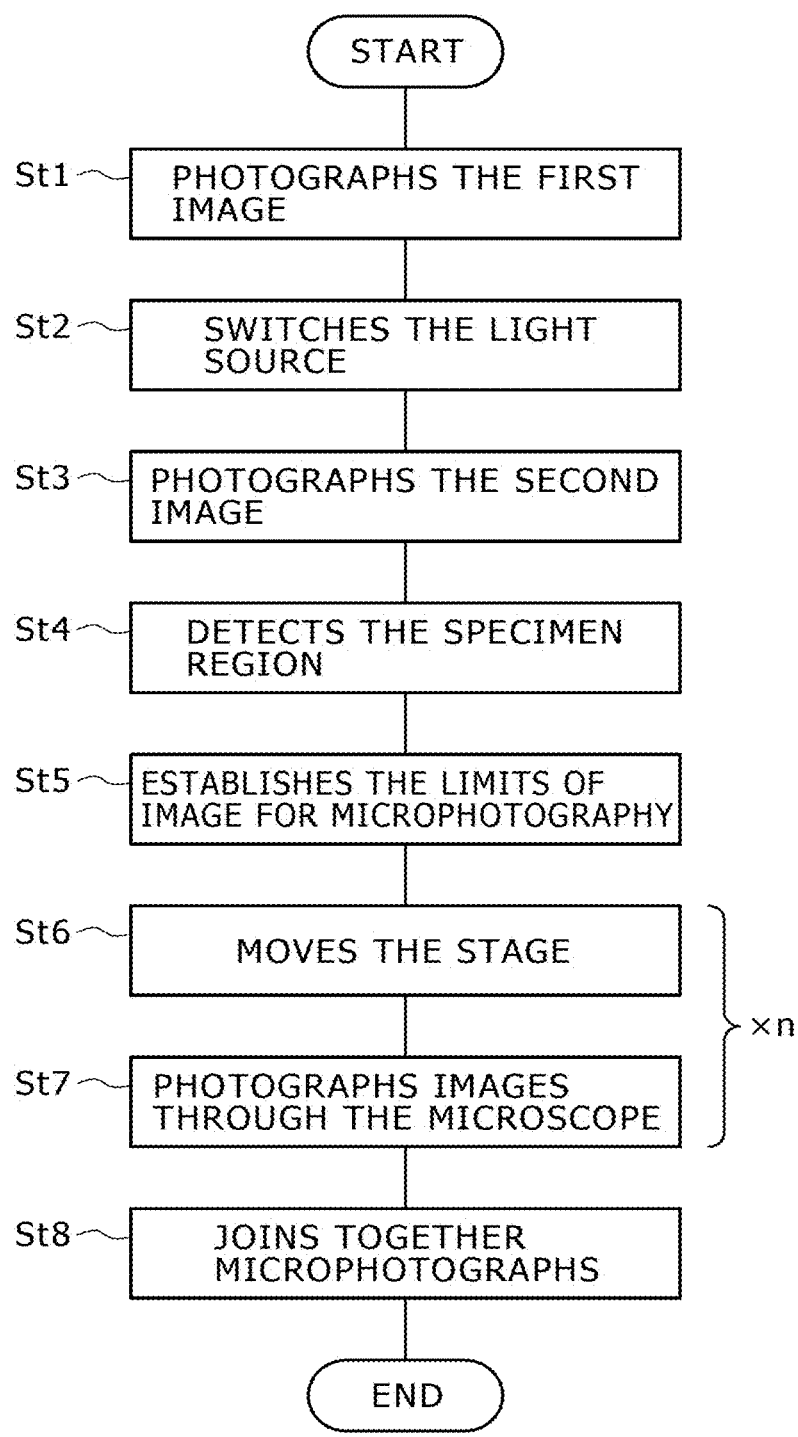
FIG. 3 is a flow chart showing the action of the microscope system mentioned above.

FIG. 3 is a flow chart showing the function of the microscope system 1.

The following description is based on the assumption that the microscope system 1 autonomously functions once it receives the user's instruction for start.

Figure 5:
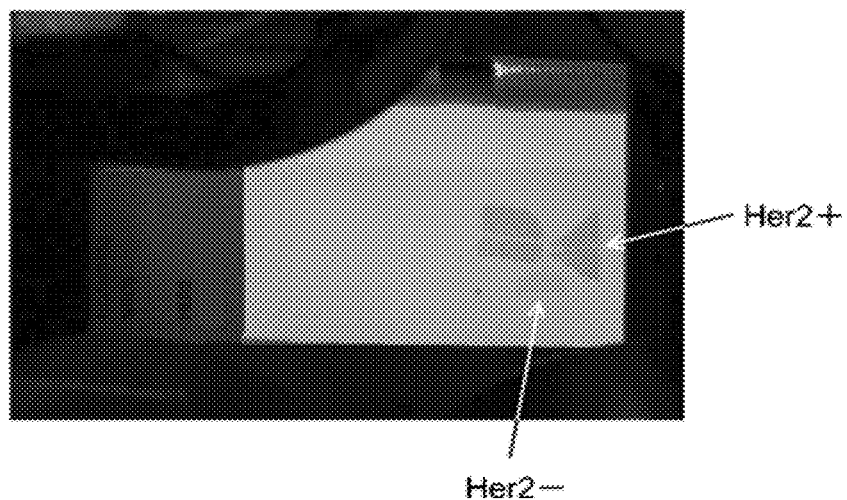
FIG. 5 is an example of the first image photographed by the microscope system mentioned above.

Upon reception of the user's instruction for start, the microscope system 1 photographs "the first image" in Step St1. To be specific, the low-power imaging device 27 photographs the preparation P through the low-power lens barrel 28 in response to the control signal from the microscope control unit 3. In this step, the microscope control unit 3 causes the visible light source 25 to emit visible light and the resulting visible light illuminates the preparation P. The first image thus photographed entirely covers the preparation P illuminated by visible light. An example of the first image is shown in FIG. 5, which is a monochromatic image converted from a color one.

The preparation P is a slide glass supporting a specimen covered with a cover glass. In FIG. 5, the specimens are cultured cells of breast cancer and normal cultured cells, both stained by IHC (Immunohistochemistry). The IHC staining is one method for detecting an antigen by means of an enzyme-labeled antibody. It is to be noted from FIG. 5 that IHC staining makes visible the positive region (indicated by Her2+) for breast cancer cells but leaves invisible the negative region (indicated by Her2−) for normal cells. Thus, the image shown in FIG. 5 is useless for the ordinary region detecting process which neglects the low-contrast negative region regarded as the background.

The first image photographed as mentioned above is sent to the first region detecting unit 41 of the specimen region detecting apparatus 4 through the microscope control unit 3.

The present disclosure may be applied to any kind of specimens without being restricted to the breast cancer cells mentioned above. This will be demonstrated in the examples given later.

In the next step St2, the microscope system 1 switches the light source for the preparation P from the visible light source 25 to the UV light source 26. Incidentally, in this step, the preparation P remains at the position where the first image has been photographed. However, the preparation P may be moved according to need as explained later.

Figure 6:
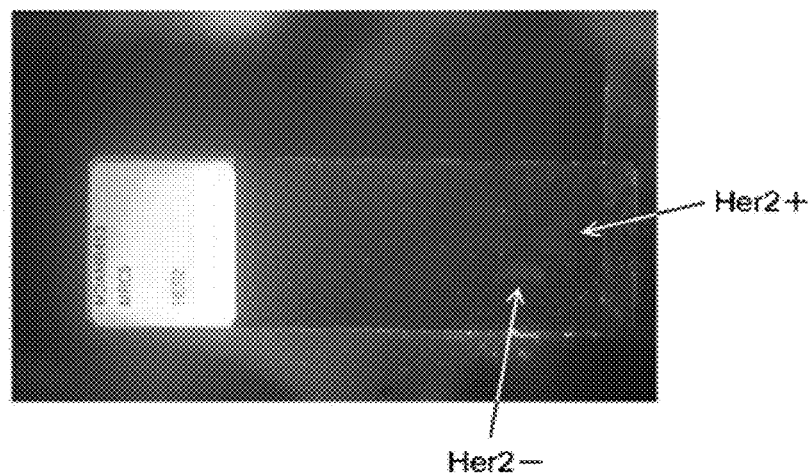
FIG. 6 is an example of the second image photographed by the microscope system mentioned above.

In the next step St3, the microscope system 1 photographs "the second image." To be specific, upon reception of the control signal from the microscope control unit 3, the low-power imaging device 27 photographs the preparation P through the low-power lens barrel 28. In this step, the microscope control unit 3 causes the UV light source 26 to emit UV light and the resulting UV light illuminates the preparation P. The second image thus photographed entirely covers the preparation P illuminated by UV light. An example of the second image is shown in FIG. 6, which is a monochromatic image converted from a color one. Incidentally, the preparation P is illuminated with UV light but the image photographed is that of visible fluorescence induced by UV light, because the low-power imaging device 27 is provided with a UV absorbing filter as mentioned above.

It is noted from FIG. 6 that under illumination with UV light, the negative region (Her2−) with a low contrast in the first image looks bright whereas the positive region (Her2+) with a high contrast in the first image looks dark. Consequently, this image permits the negative region to be detected by the region detecting process. Incidentally, the emission of fluorescence from the negative region under illumination with UV light is probably due to the presence of amino acid in the specimen. By contrast, the lack of the emission of fluorescence from the positive region is probably due to the absence of amino acid in the specimen which results from decomposition by reaction with the stain. This suggests that the present disclosure is applicable to specimens (most living tissues) containing amino acids.

The second image photographed in this way is subsequently sent to the second region detecting part 42 of the specimen detecting apparatus 4 through the microscope control unit 3.

Figure 4:
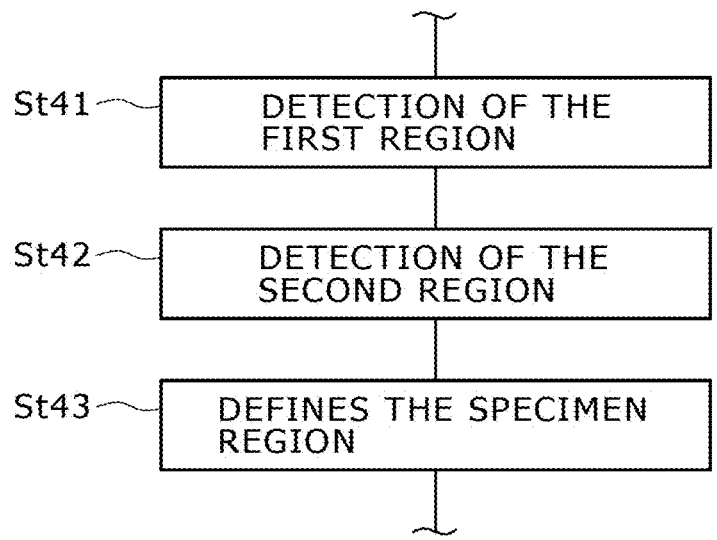
FIG. 4 is a flow chart showing the action of the specimen region detecting apparatus in the microscope system mentioned above.

In the next step St4, the microscope system 1 detects the "specimen region" from the first and second images. The step for specimen region detection proceeds according to the flow chart shown in FIG. 4. This step is executed by the specimen region detecting apparatus 4.

Figure 7A:
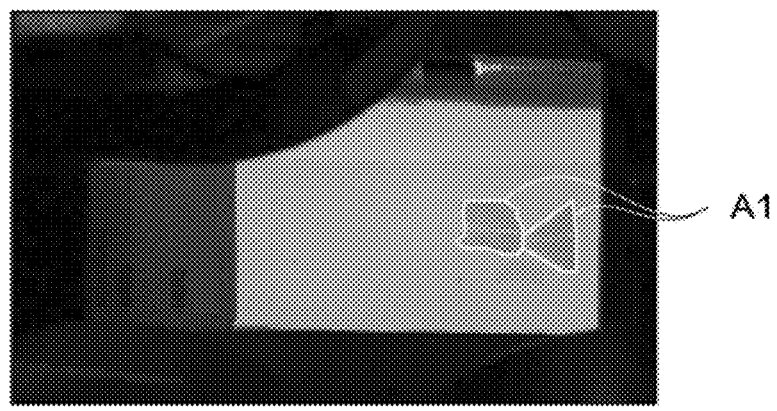
FIGS. 7A and 7B are schematic diagrams showing the first region which has been detected by the first region detecting unit in the microscope system mentioned above.
Figure 7B:
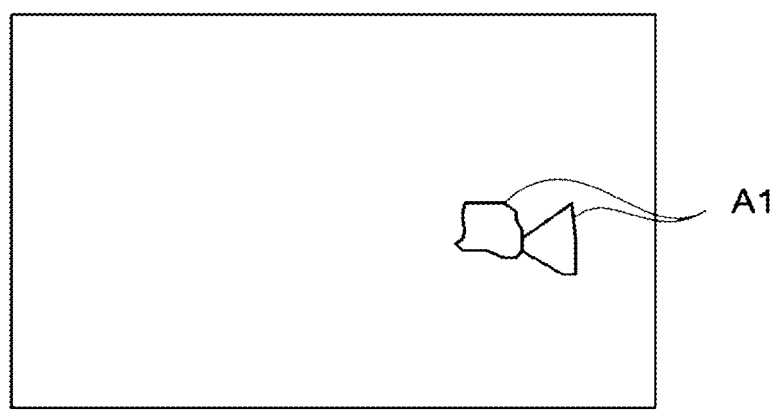

In Step St41, the first region detecting unit 41 detects the "first region" from the first image supplied from the microscope control unit 3. How to detect the first region is schematically shown in FIGS. 7A and 7B. The first region has the border indicated by "Region A1" in FIGS. 7A and 7B. The first region detecting unit 41 performs the region detecting process on the first image to identify the border as shown in FIG. 7A. The region detecting process is accomplished with the help of image contrast (or visual features such as illuminance and color). This technique relies on the region extraction by threshold value process and labeling process or the edge detection by means of digital filters. The region which the first region detecting unit 41 has detected in the first image with the help of contrast is designated as the first region.

The first region detecting unit 41 is able to detect the positive region by the region detecting process from the first image but unable to detect the negative region, as mentioned above. The first region detecting unit 41 supplies the specimen region defining unit 43 with both the first region shown in FIG. 7A and the information about the edge of the first image shown in FIG. 7B.

Incidentally, the first region detecting unit 41 may work in such a way as to acquire the first region together with the "position reference information." The position reference information is about the position of characteristic figures in the first image, such figures including labels and letters attached to the preparation P and the border of the preparation P. This provision is intended to help the specimen region defining step (St43 mentioned later) to work effectively even though the preparation P moves during transition from the step of taking the first image to the step of taking the second image. The position reference information is not required if it is anticipated that there is no possibility of the preparation P moving in the first and second photographing steps. The first region detecting unit 41 also sends the thus obtained position reference information to the specimen region defining unit 43.

Figure 8A:
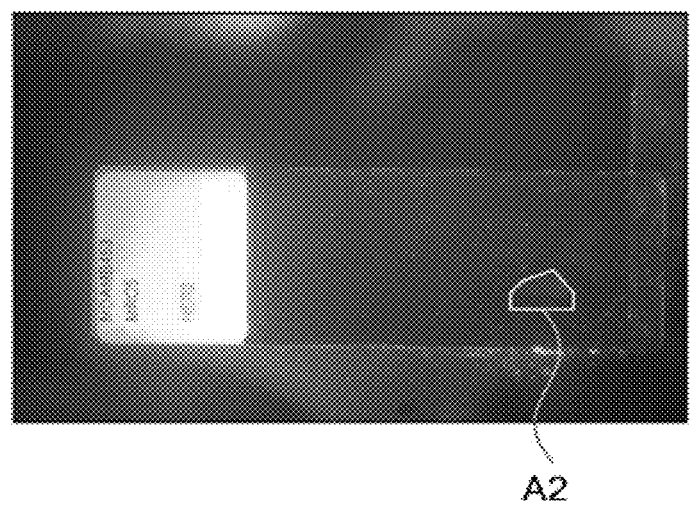
FIGS. 8A and 8B are schematic diagrams showing the second region which has been detected by the second region detecting unit in the microscope system mentioned above.
Figure 8B:
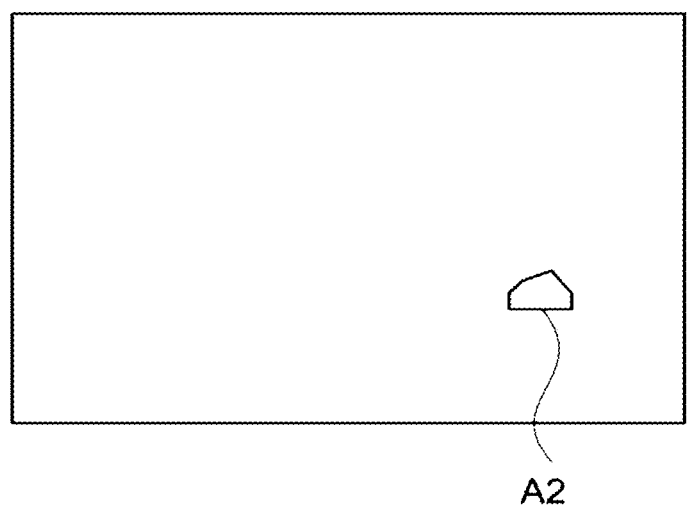

In the next step St42, the second region detecting unit 42 detects the "second region" from the second image supplied from the microscope control unit 3. The detection of the second region is schematically shown in FIGS. 8A and 8B. The border of the second region is indicated by region A2 in FIGS. 8A and 8B. The second region detecting unit 42 performs the region detecting process on the first image as shown in FIG. 8A. The region detecting process is accomplished with the help of image contrast (or visual features such as illuminance and color). This technique relies on the region extraction by threshold value process and labeling process or the edge detection by means of digital filters. The region which the second region detecting unit 42 has detected in the second image with the help of contrast is designated as the second region.

As mentioned above, the second region detecting unit 42 is able to detect the negative region which emits fluorescence, but it is unable to detect the position region which emits no fluorescence. The second region detecting unit 42 supplies the specimen region defining unit 43 with both the second region shown in FIG. 8A and the information about the edge of the second image shown in FIG. 8B.

Incidentally, the second region detecting unit 42, like the first region detecting unit 41, may work in such a way as to acquire the "position reference information." The position reference information is about the position of characteristic figures in the second image. The second region detecting unit 42 also sends the thus obtained position reference information to the specimen region defining unit 43.

Figure 9:
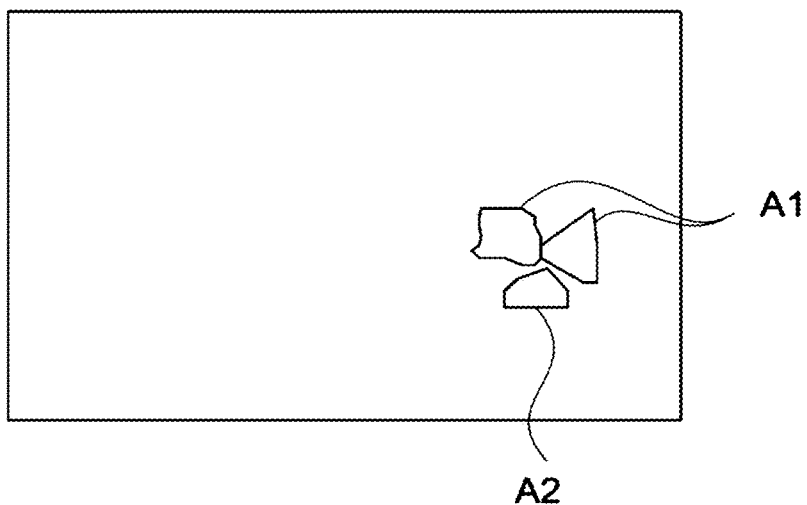
FIG. 9 is a schematic diagram showing the specimen region which has been defined by the specimen region defining unit in the microscope system mentioned above.

In the next step St43, the specimen region defining unit 43 adds the first region to the second region in such a way that the periphery of the first image coincides with that of the second image. The combined region is defined as the region where there exists the specimen. FIG. 9 shows the thus defined specimen regions which are denoted by region A1 and region A2. The thus defined specimen region is sent to the microscope control unit 3 by the specimen region defining unit 43.

The specimen region defining unit 43 compares the first position reference information with the second one if they have been obtained from the first and second images. If there is a difference between the two images in position reference information, the specimen region defining unit 43 determines that the preparation P has moved in the period after the first image has been taken and before the second image is taken, and it corrects the positions of the first and second regions in the first and second images so that an agreement is obtained for the position reference information.

Figure 10:
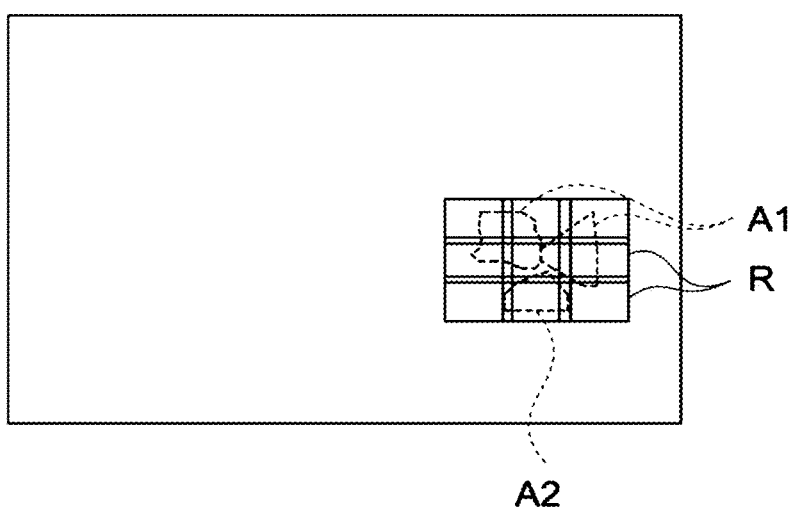
FIG. 10 is a schematic diagram showing the microscope visual field established by the microscope system mentioned above.
Figure 11A:
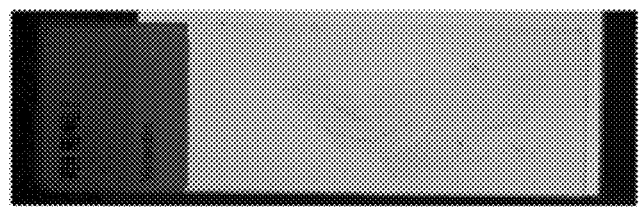
FIGS. 11A and 11B are images of the specimen (pig loin: IHC stained (labeling enzyme=Vimentin)), pertaining to one example of the present disclosure.
Figure 11B:
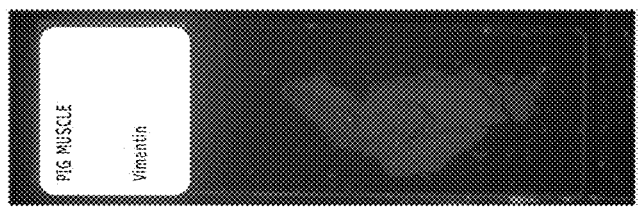
Figure 12A:
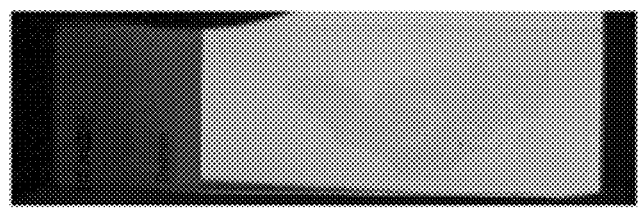
FIGS. 12A and 12B are images of the specimen (pig loin: IHC stained (labeling enzyme=Desmin)), pertaining to one example of the present disclosure.
Figure 12B:
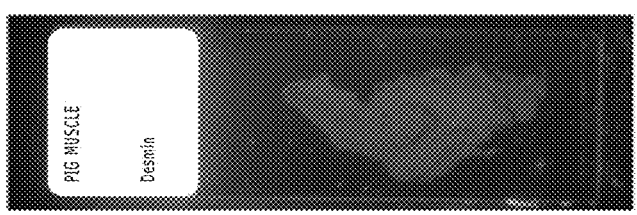
Figure 13A:
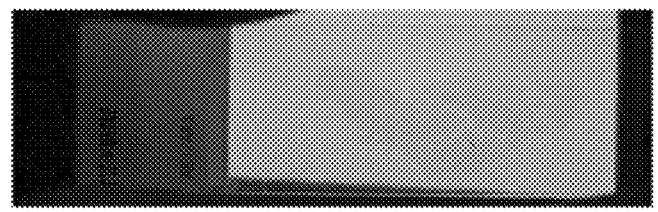
FIGS. 13A and 13B are images of the specimen (pig loin: IHC stained (labeling enzyme=AE1/AE3)), pertaining to one example of the present disclosure.
Figure 13B:
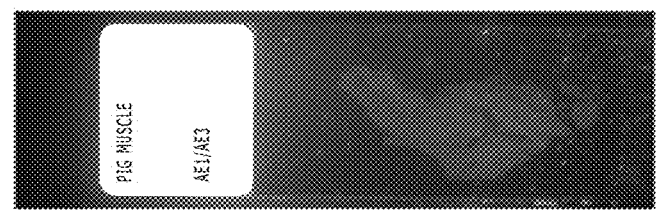

With FIG. 3 revisited, the microscope system 1 establishes the "microscope photographing region" in Step St5. The microscope photographing region is schematically shown in FIG. 10, with regions A1 and A2 denoting the specimen regions calculated by the specimen region detecting apparatus 4 and region R denoting the microscope photographing region that overlaps the regions.

The microscope covers a certain photographing range which is seen by the high-power imaging device 21 through the high-power lens barrel 22 set at a prescribed magnifying power. The microscope control unit 3 determines its photographing range in response to the magnifying power specified by the user. In the case where a single photographing range does not cover all the specimen regions, the microscope control unit 3 arranges more than one photographing range as shown in FIG. 10. Incidentally, the micrograph control unit 3 is able to arrange the photographing ranges which overlap with one another as shown in FIG. 10. This facilitates the step of joining together the microscope images as mentioned later.

In the next step St6, the microscope system 1 causes the stage drive unit 24 to move the stage 23. The microscope control unit 3 sends control signals to the stage drive unit 24 so that the microscope photographing range coincides with the field of view of the high-power imaging device 21. The amount of movement of the stage 23 may be equal to the difference between the coordinate of the center of the second image and the coordinate of the center of the microscope photographing range. In the case where more than one microscope photographing range is set up, the microscope control unit 3 determines the photographing order and moves the stage for the first microscope photographing range.

In the next step St7, the microscope system 1 causes the high-power imaging device 21 to take the microscopic image of the preparation P. The microscope control unit 3 sends control signals to the high-power lens barrel 22 so that the magnifying power is adjusted to the one specified by the user and the exact focusing is obtained at the magnifying power. The microscope control 3 also sends control signals to the high-power imaging device 21, thereby causing it to photograph the preparation P. This step is executed in such a way that the field of view of the high-power imaging device 21 coincides with the microscope photographing range because the stage 23 has been moved as mentioned above.

In the case where more than on microscope photographing range is set up, the microscope control unit 3 causes again the stage drive unit 24 to move the stage 23 so that the high-power imaging device 21 photographs the next microscope photographing range of the preparation P. The microscope control unit 3 repeats the procedure for the movement of the stage 23 (in step St6) and the photographing by the high-power imaging device 21 (in step St7) until all of the microscope photographing ranges are photographed.

In the case where adjacent microscope images are photographed, the microscope system 1 joins together such individual microphotographs in step St8. To be specific, the microscope control unit 3 extracts more than one characteristic feature in the overlapping area of the adjacent two microphotographs and then join them together (for stitching) so that such features coincide with one another. In this way, contiguous stained regions exceeding a single microscope photographing range can be photographed.

The microscope system 1 according to the embodiment mentioned above acquires images for detection of specimen region under illumination with visible light and UV light and overlaps the results of detection, thereby determining the range of photographing by the microscope. In this way it detects the region which is not detected due to low contrast under illumination with visible light.

The present disclosure is not restricted to the foregoing embodiment and it may be modified and changed variously within the scope thereof.

EXAMPLES

The examples of the present disclosure will be described below. The present disclosure is applicable to a variety of specimens as mentioned above. The following examples demonstrate the images of various specimens which were photographed at equal magnifications under illumination with visible light and UV light, the images corresponding to the first and second images in the embodiment mentioned above. The following examples are intended to observe whether or not each specimen emits fluorescence under illumination with UV light.

The specimens used in this example are stained living tissues of pig and cattle. The living tissues include pig loin, pig stomach, pig liver, cattle abomasum, cattle heart, and cattle liver. Each living tissue undergoes IHC staining with any one of four labeling enzymes which include Vimentin, Desmin, AE1/AE3, and LCA. FIGS. 11A to 34B are the images of specimens which were photographed under illumination with visible light and UV light. In each figure, the image taken under illumination with visible light is indicated by FIGS. 11A to 34A and the image taken under illumination with UV light is indicated by FIGS. 11B to 34B. These images are monochromatic ones which have been converted from color ones. FIG. 35 is a table showing how each specimen emits fluorescence under illumination with UV light. In this table, the specimens are classified according to the intensity of fluorescence which are rated as strong (o), weak (Δ), and none (x).

Figure 14A:
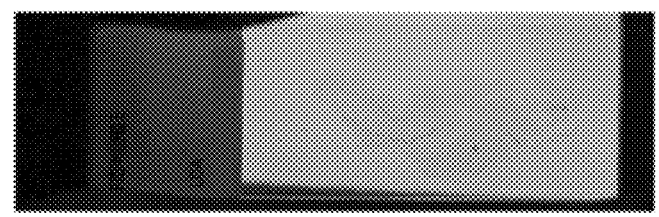
FIGS. 14A and 14B are images of the specimen (pig loin: IHC stained (labeling enzyme=LCA)), pertaining to one example of the present disclosure.
Figure 14B:
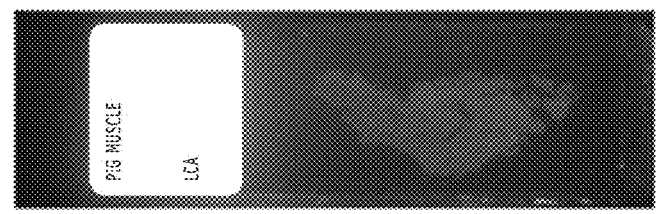
Figure 15A:
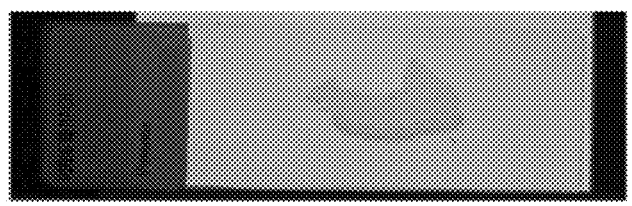
FIGS. 15A and 15B are images of the specimen (pig stomach: IHC stained (labeling enzyme=Vimentin)), pertaining to one example of the present disclosure.
Figure 15B:
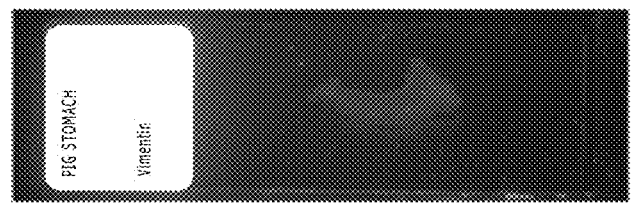
Figure 16A:
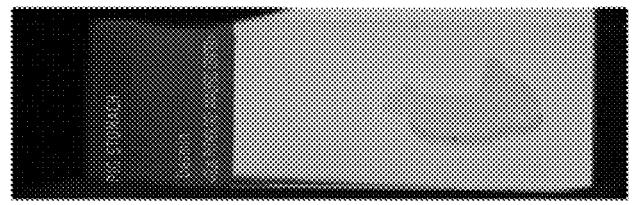
FIGS. 16A and 16B are images of the specimen (pig stomach: IHC stained (labeling enzyme=Desmin)), pertaining to one example of the present disclosure.
Figure 16B:
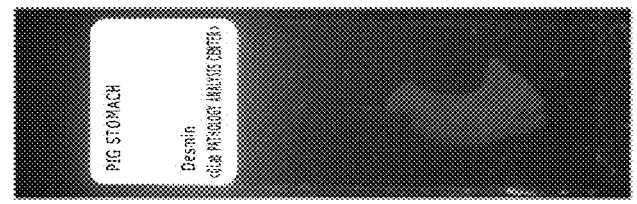
Figure 17A:
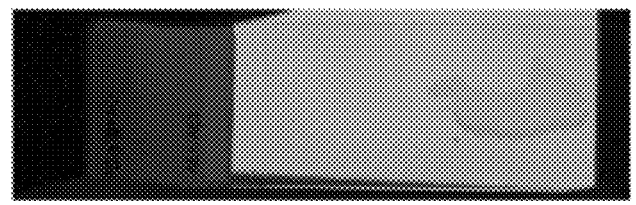
FIGS. 17A and 17B are images of the specimen (pig stomach: IHC stained (labeling enzyme=AE1/AE3)), pertaining to one example of the present disclosure.
Figure 17B:
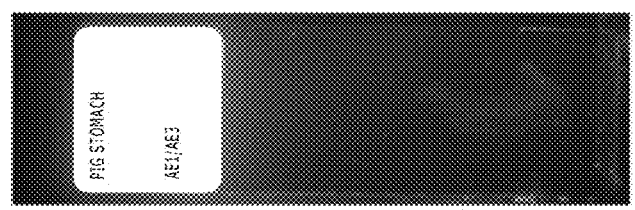

FIGS. 11A to 14B are the images of specimens of pig loin which were photographed under illumination with visible light and UV light. The labeling enzymes used for these specimens are Vimentin (FIGS. 11A and 11B), Desmin (FIGS. 12A and 12B), AE1/AE3 (FIGS. 13A and 13B), and LCA (FIGS. 14A and 14B). These figures show that each labeling enzyme emits fluorescence.

Figure 18A:
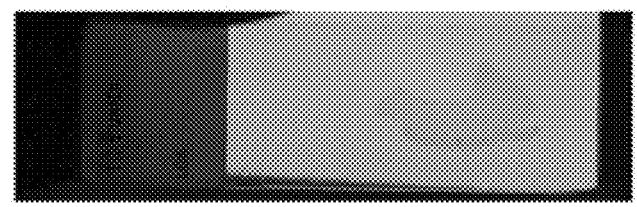
FIGS. 18A and 18B are images of the specimen (pig stomach: IHC stained (labeling enzyme=LCA)), pertaining to one example of the present disclosure.
Figure 18B:
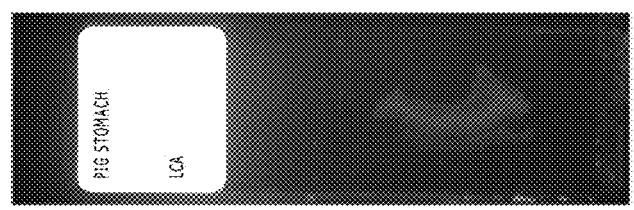
Figure 19A:
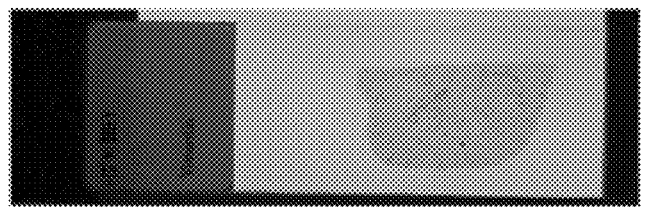
FIGS. 19A and 19B are images of the specimen (pig kidney: IHC stained (labeling enzyme=Vimentin)), pertaining to one example of the present disclosure.
Figure 19B:
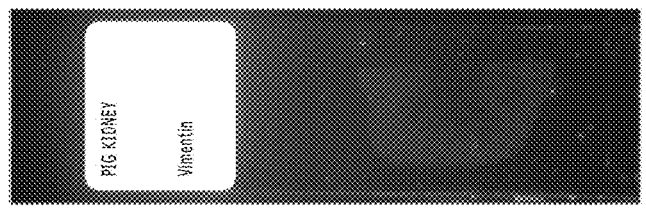
Figure 20A:
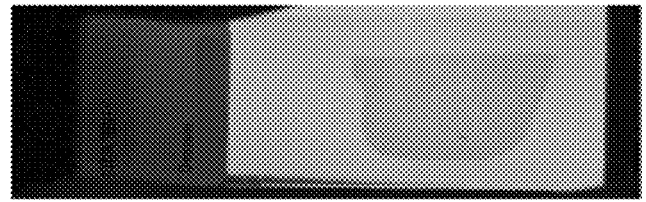
FIGS. 20A and 20B are images of the specimen (pig kidney: IHC stained (labeling enzyme=Desmin)), pertaining to one example of the present disclosure.
Figure 20B:
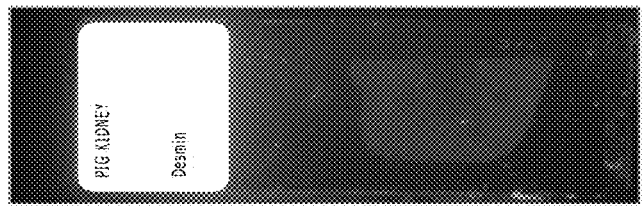
Figure 21A:
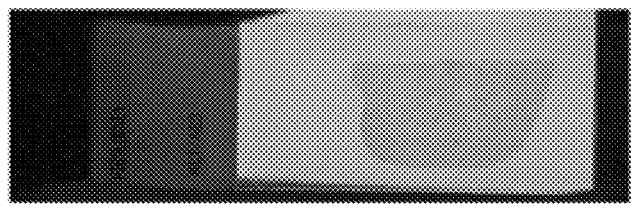
FIGS. 21A and 21B are images of the specimen (pig kidney: IHC stained (labeling enzyme=AE1/AE3)), pertaining to one example of the present disclosure.
Figure 21B:
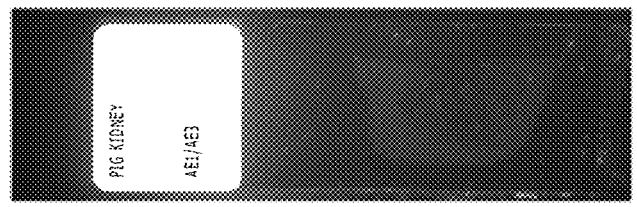

FIGS. 15A to 18B are the images of specimens of pig stomach which were photographed under illumination with visible light and UV light. The labeling enzymes used for these specimens are Vimentin (FIGS. 15A and 15B), Desmin (FIGS. 16A and 16B), AE1/AE3 (FIGS. 17A and 17B), and LCA (FIGS. 18A and 18B). These figures show that each labeling enzyme emits fluorescence although AE1/AE3 emits weak fluorescence.

Figure 22A:
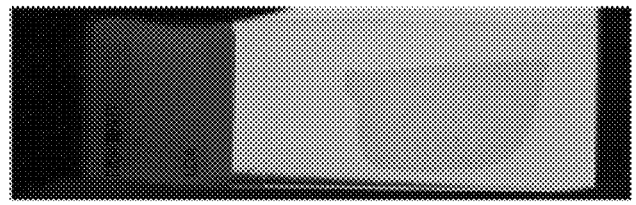
FIGS. 22A and 22B are images of the specimen (pig kidney: IHC stained (labeling enzyme=LCA)), pertaining to one example of the present disclosure.
Figure 22B:
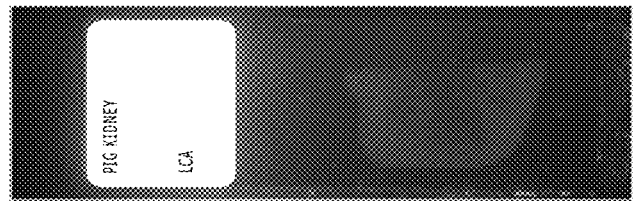
Figure 23A:
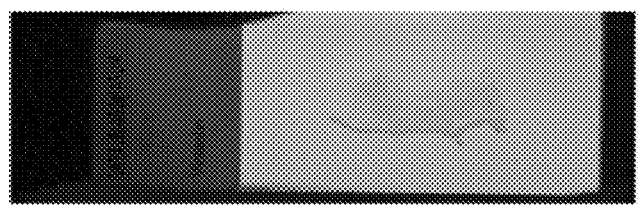
FIGS. 23A and 23B are images of the specimen (cattle abomasum: IHC stained (labeling enzyme=Vimentin)), pertaining to one example of the present disclosure.
Figure 23B:
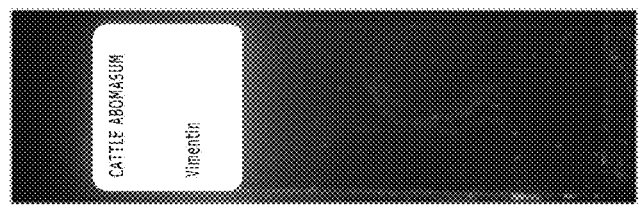
Figure 24A:
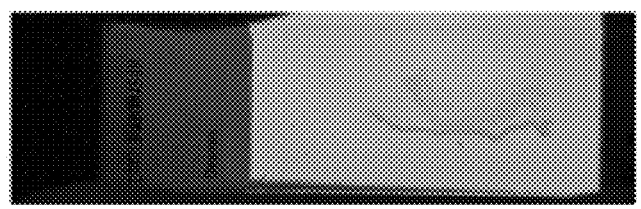
FIGS. 24A and 24B are images of the specimen (cattle abomasum: IHC stained (labeling enzyme=Desmin)), pertaining to one example of the present disclosure.
Figure 24B:
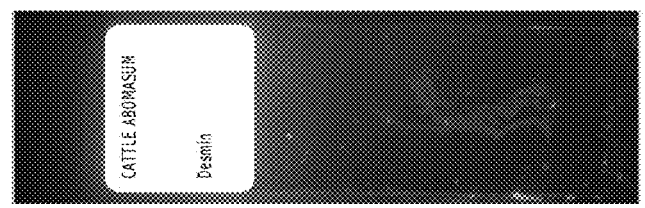
Figure 25A:
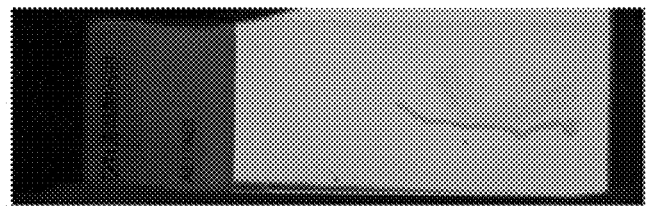
FIGS. 25A and 25B are images of the specimen (cattle abomasum: IHC stained (labeling enzyme=AE1/AE3)), pertaining to one example of the present disclosure.
Figure 25B:
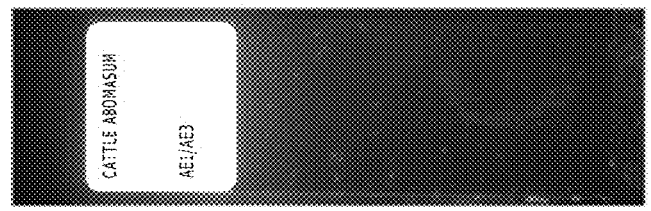

FIGS. 19A to 22B are the images of specimens of pig kidney which were photographed under illumination with visible light and UV light. The labeling enzymes used for these specimens are Vimentin (FIGS. 19A and 19B), Desmin (FIGS. 20A and 20B), AE1/AE3 (FIGS. 21A and 21B), and LCA (FIGS. 22A and 22B). These figures show that each labeling enzyme emits fluorescence.

Figure 26A:
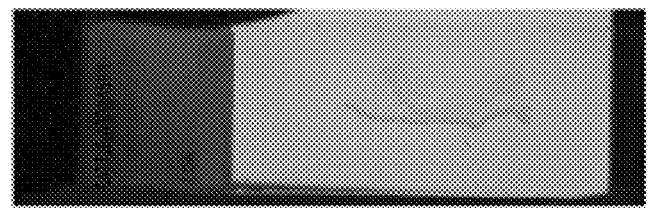
FIGS. 26A and 26B are images of the specimen (cattle abomasum: IHC stained (labeling enzyme=LCA)), pertaining to one example of the present disclosure.
Figure 26B:
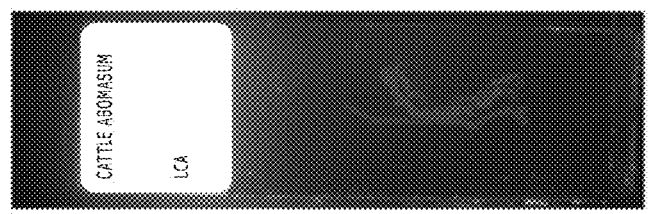
Figure 27A:
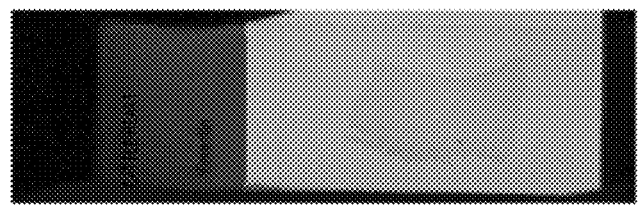
FIGS. 27A and 27B are images of the specimen (cattle heart: IHC stained (labeling enzyme=Vimentin)), pertaining to one example of the present disclosure.
Figure 27B:
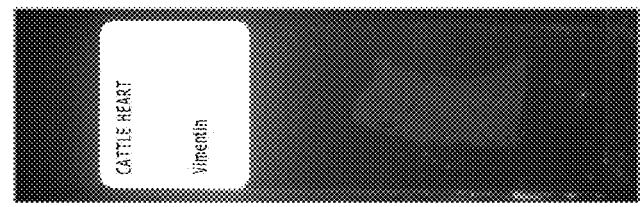
Figure 28A:
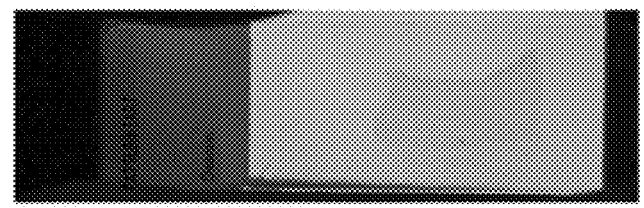
FIGS. 28A and 28B are images of the specimen (cattle heart: IHC stained (labeling enzyme=Desmin)), pertaining to one example of the present disclosure.
Figure 28B:
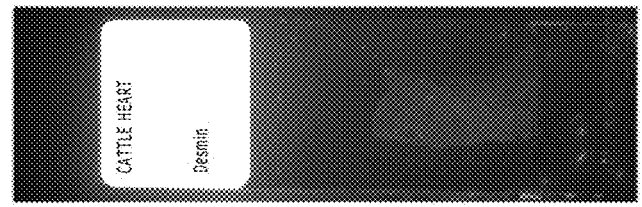
Figure 29A:
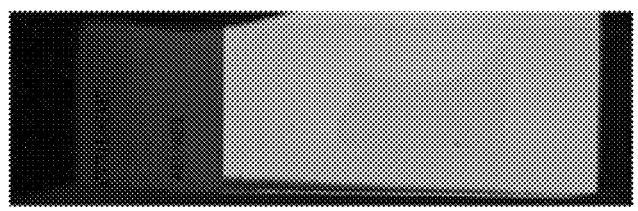
FIGS. 29A and 29B are images of the specimen (cattle heart: IHC stained (labeling enzyme=AE1/AE3)), pertaining to one example of the present disclosure.
Figure 29B:
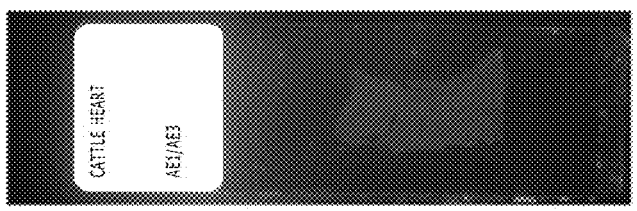

FIGS. 23A to 26B are the images of specimens of cattle abomasum which were photographed under illumination with visible light and UV light. The labeling enzymes used for these specimens are Vimentin (FIGS. 23A and 23B), Desmin (FIGS. 24A and 24B), AE1/AE3 (FIGS. 25A and 25B), and LCA (FIGS. 26A and 26B). These figures show that Vimentin emits no fluorescence, Desmin and AE1/AE3 emit weak fluorescence, and LCA emits fluorescence.

Figure 30A:
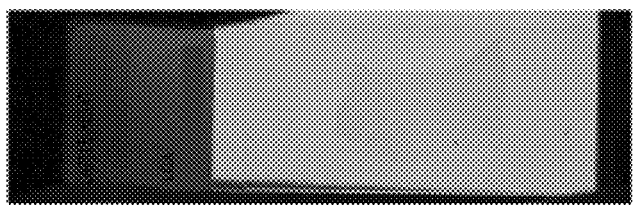
FIGS. 30A and 30B are images of the specimen (cattle heart: IHC stained (labeling enzyme=LCA)), pertaining to one example of the present disclosure.
Figure 30B:
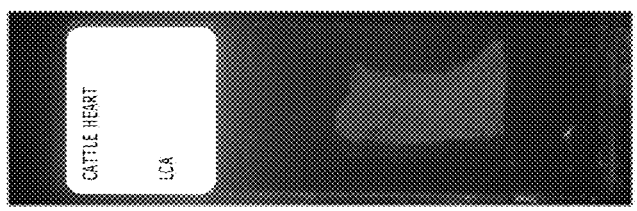
Figure 31A:
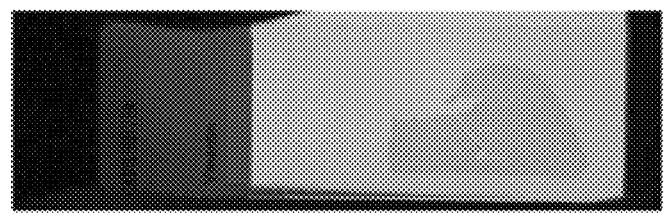
FIGS. 31A and 31B are images of the specimen (cattle liver: IHC stained (labeling enzyme=Vimentin)), pertaining to one example of the present disclosure.
Figure 31B:
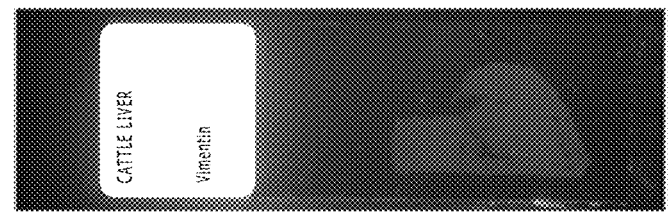
Figure 32A:
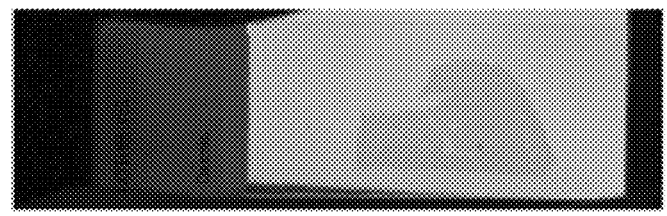
FIGS. 32A and 32B are image of the specimen (cattle liver: IHC stained (labeling enzyme=Desmin)), pertaining to one example of the present disclosure.
Figure 32B:
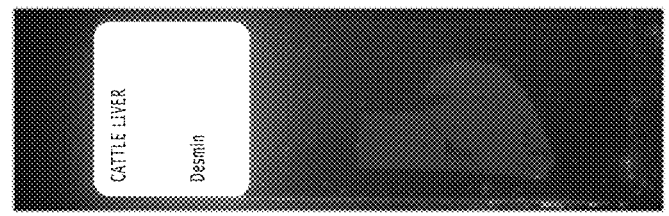
Figure 33A:
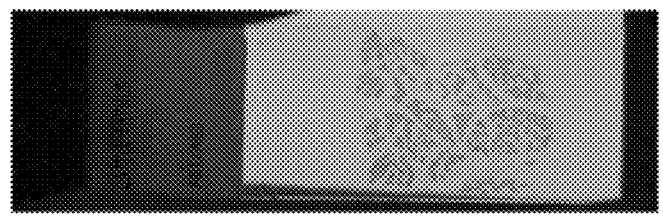
FIGS. 33A and 33B are images of the specimen (cattle liver: IHC stained (labeling enzyme=AE1/AE3)), pertaining to one example of the present disclosure.
Figure 33B:
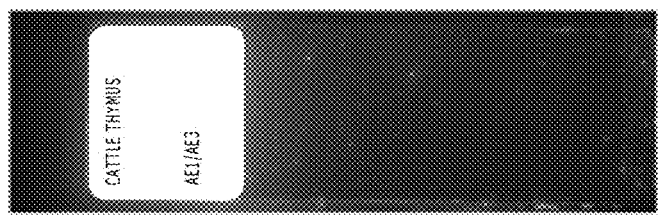

FIGS. 27A to 30B are the images of specimens of cattle heart which were photographed under illumination with visible light and UV light. The labeling enzymes used for these specimens are Vimentin (FIGS. 27A and 27B), Desmin (FIGS. 28A and 28B), AE1/AE3 (FIGS. 29A and 29B), and LCA (FIGS. 30A and 30B). These figures show that each labeling enzyme emits fluorescence although Vimentin and Desmin emit weak fluorescence.

Figure 34A:
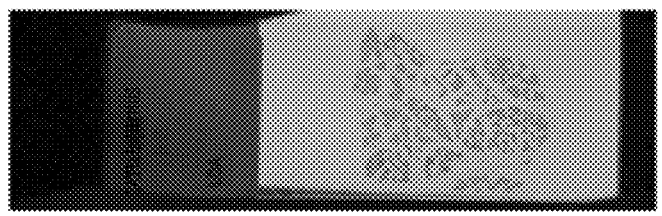
FIGS. 34A and 34B are images of the specimen (cattle liver: IHC stained (labeling enzyme=LCA)), pertaining to one example of the present disclosure.
Figure 34B:
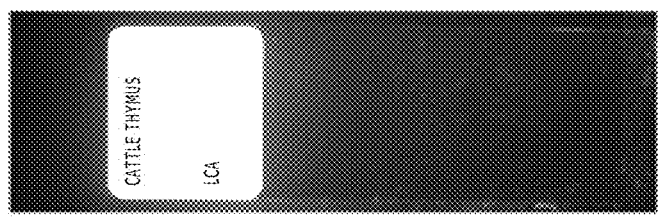
Figure 36A:
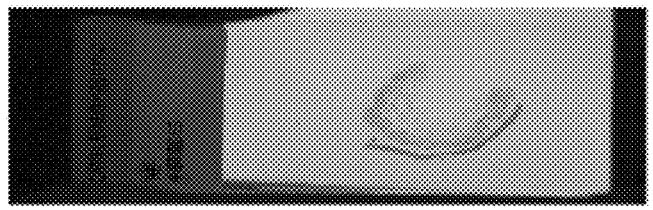
FIGS. 36A and 36B are images of the specimen (cattle abomasum: HE stained) pertaining to one example of the present disclosure.
Figure 36B:
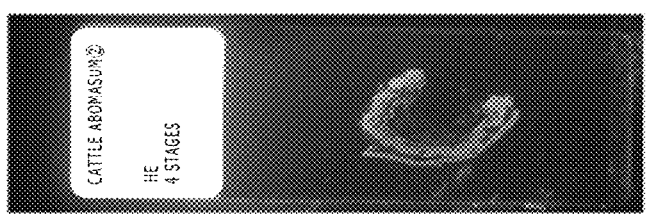
Figure 37A:
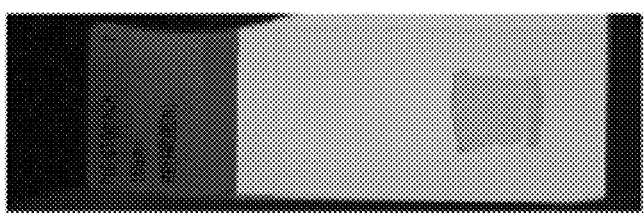
FIGS. 37A and 37B are images of the specimen (cattle stomach: HE stained) pertaining to one example of the present disclosure.
Figure 37B:
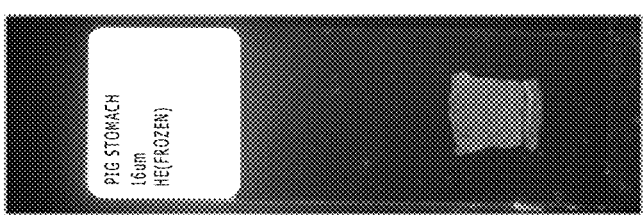

FIGS. 31A to 34B are the images of specimens of cattle liver which were photographed under illumination with visible light and UV light. The labeling enzymes used for these specimens are Vimentin (FIGS. 31A and 31B), Desmin (FIGS. 32A and 32B), AE1/AE3 (FIGS. 33A and 33B), and LCA (FIGS. 34A and 34B). These figures show that each labeling enzyme emits fluorescence although AE1/AE3 emits weak fluorescence.

It is apparent from FIG. 35 that emission of fluorescence depends on the labeling enzyme (for IHC staining) and the kind of living tissue. It was found that not all specimens emit fluorescence but most ones do.

Figure 38A:
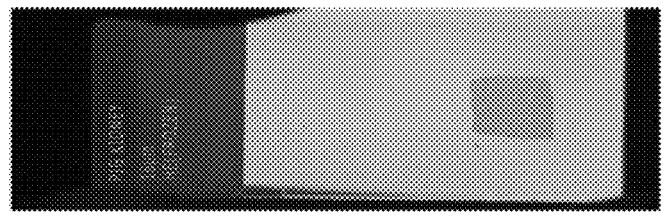
FIGS. 38A and 38B are images of the specimen (cattle kidney: HE stained) pertaining to one example of the present disclosure.
Figure 38B:
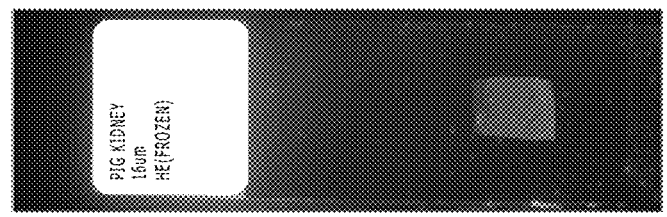

As a supplement to the investigation on IHC staining mentioned above, the emission of fluorescence from specimens stained with HE (Hematoxylin-Eosin) was investigated. FIGS. 36A to 38B show the images of HE stained living tissues under illumination with visible light and UV light. The living tissues are cattle abomasum (FIGS. 36A and 36B), pig stomach (FIGS. 37A and 37B), and pig kidney (FIGS. 38A and 38B). These monochromatic images were obtained by conversion from color ones.

It is noted from these images that the HE-stained specimens also emit fluorescence under illumination with UV light. The HE-stained specimens are observed with reflected light and transmitted light under illumination with visible light, whereas they are observed with spontaneously emitted fluorescence under illumination with UV light. Such fluorescence permits easy detection of minute regions.

The present disclosure contains subject matter related to that disclosed in Japanese Priority Patent Application JP 2010-268442 filed in the Japan Patent Office on Dec. 1, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method, comprising:
    detecting a first region and first position reference information, the first region being a region with contrast in a first image of an object for observation which is photographed under illumination with visible light, the first position reference information relating to a position of one or more features of the first image, wherein detecting the first region comprises detecting at least one border of the first region using one or more digital filters;
    detecting a second region and second position reference information, the second region being a region with contrast in a second image of said object for observation which is photographed under illumination with ultraviolet light, the second position reference information relating to a position of one or more features of the second image, wherein detecting the second region comprises detecting at least one border of the second region using one or more digital filters;

defining, based at least in part on the first and second regions and the first and second position reference information, a specimen region, encompassing the first region and the second region, where there exists a specimen in the object for observation; and in response to the defining of the specimen region, causing at least a portion of the specimen region to be photographed.

2. The method for detecting the specimen region according to claim 1, wherein the causing comprises causing the at least a portion of the specimen region to be photographed under a microscope.

3. The method for detecting the specimen region according to claim 1, wherein said specimen is a living tissue containing amino acids.

4. The method for detecting the specimen region according to claim 3, wherein said specimen is an immunohistochemically stained specimen.

5. An apparatus comprising:
at least one processor programmed to:
detect a first region and first position reference information, the first region being a region with contrast in a first image of an object for observation which is photographed under illumination with visible light, the first position reference information relating to a position of one or more features of the first image, wherein detection of the first region comprises detection of at least one border of the first region using one or more digital filters;

detect a second region and second position reference information, the second region being a region with contrast in a second image of said object for observation which is photographed under illumination with ultraviolet light, the second position reference information relating to a position of one or more features of the second image, wherein detection of the second region comprises detection of at least one border of the second region using one or more digital filters;

define, based at least in part on the first and second regions and the first and second position reference information, a specimen region, encompassing the first region and the second region, where there exists a specimen in the object for observation; and in response to the defining of the specimen region, causing at least a portion of the specimen region to be photographed.

6. At least one storage device having encoded thereon instructions which, when executed, perform a method comprising:

detecting a first region and first position reference information, the first region being a region with contrast in a first image of an object for observation which is photographed under illumination with visible light, the first position reference information relating to a position of one or more features of the first image, wherein detecting the first region comprises detecting at least one border of the first region using one or more digital filters;

detecting a second region and second position reference information, the second region being a region with contrast in a second image of said object for observation which is photographed under illumination with ultraviolet light, the second position reference information relating to a position of one or more features of the second image, wherein detecting the second region comprises detecting at least one border of the second region using one or more digital filters;

defining, based at least in part on the first and second regions and the first and second position reference information, a specimen region, encompassing the first region and the second region, where there exists a specimen in the object for observation; and in response to the defining of the specimen region, causing at least a portion of the specimen region to be photographed.

* * * * *